(12) United States Patent
Saban et al.

(10) Patent No.: US 6,777,847 B1
(45) Date of Patent: Aug. 17, 2004

(54) ROTOR CORE UTILIZING LAMINATIONS HAVING SLOTS WITH DUAL DIRECTION SKEW PORTIONS

(75) Inventors: Daniel M. Saban, Rockford, IL (US); Charles Michael Stephens, Pattersonville, NY (US); Gerald Burt Kliman, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/806,606

(22) PCT Filed: Jun. 25, 1999

(86) PCT No.: PCT/US99/14391

§ 371 (c)(1),
(2), (4) Date: Apr. 2, 2001

(87) PCT Pub. No.: WO00/01058

PCT Pub. Date: Jan. 6, 2000

Related U.S. Application Data

(60) Provisional application No. 60/090,773, filed on Jun. 26, 1998.

(51) Int. Cl.[7] .................... H02K 17/16; H02K 17/22; H02K 17/42; H02K 19/14
(52) U.S. Cl. ................. 310/211; 310/210; 310/179; 310/40 R
(58) Field of Search .............................. 310/211, 210, 310/179, 40 R

(56) References Cited

U.S. PATENT DOCUMENTS

| | | | | |
|---|---|---|---|---|
| 2,370,458 A | * | 2/1945 | Goran ................... | 310/211 |
| 2,648,788 A | * | 8/1953 | Fleischer ............... | 310/51 |
| 2,794,138 A | * | 5/1957 | Dunn, Jr. ............... | 310/211 |
| 3,027,474 A | * | 3/1962 | Rosenberry, Jr. ........ | 310/211 |
| 3,778,652 A | * | 12/1973 | Endress ................. | 310/211 |
| 3,848,146 A | * | 11/1974 | Tourtellot et al. ...... | 310/163 |
| 4,616,151 A | * | 10/1986 | Pryjmak ................ | 310/216 |
| 5,010,266 A | * | 4/1991 | Uchida ................. | 310/156.22 |
| 5,155,404 A | * | 10/1992 | Sadarangani ........... | 310/211 |
| 5,182,483 A | * | 1/1993 | Hibino et al. ......... | 310/211 |
| 5,402,026 A | * | 3/1995 | Gertmar et al. ........ | 310/182 |
| 5,548,172 A | * | 8/1996 | Kliman et al. ......... | 310/156.81 |
| 5,637,943 A | * | 6/1997 | Berger ................. | 310/211 |
| 5,640,064 A | * | 6/1997 | Boyd et al. ........... | 310/211 |
| 5,852,338 A | * | 12/1998 | Boyd et al. ........... | 310/89 |
| 5,911,453 A | * | 6/1999 | Boyd et al. ........... | 29/596 |
| 6,088,905 A | * | 7/2000 | Boyd et al. ........... | 29/598 |
| 6,088,906 A | * | 7/2000 | Hsu et al. ............ | 29/598 |
| 6,218,760 B1 | * | 4/2001 | Sakuragi et al. ....... | 310/254 |
| 6,223,416 B1 | * | 5/2001 | Boyd et al. ........... | 29/596 |
| 6,369,686 B1 | * | 4/2002 | Pielok ................. | 336/234 |
| 6,414,412 B1 | * | 7/2002 | Hao .................... | 310/200 |
| 6,455,970 B1 | * | 9/2002 | Shafer et al. ......... | 310/179 |
| 6,515,395 B1 | * | 2/2003 | Jansen ................. | 310/211 |

\* cited by examiner

*Primary Examiner*—Burton S. Mullins
*Assistant Examiner*—Pedro J. Cuevas
(74) *Attorney, Agent, or Firm*—Karl A. Vick, Esq.; Armstrong Teasdale LLP

(57) ABSTRACT

Divided magnet rotors R having a stepped skew rather than a helical skew are described. The stepped skew enables the use of straight magnet sections (44) that can be inserted into the rotor core notches (38) thereby eliminating the need to produce a helix from the rotor cage. The stepped skew is effective in decoupling stator slot order harmonics. In addition, the stepped skew rotor R includes, in some embodiments, open slots (22) so that the rotor is not subject to rotor bridge saturation.

26 Claims, 8 Drawing Sheets

PRIOR ART

US 6,777,847 B1

ROTOR CORE UTILIZING LAMINATIONS HAVING SLOTS WITH DUAL DIRECTION SKEW PORTIONS

CROSS REFERENCE TO RELATED APPLICATION

This application claims the benefit of U.S. Provisional Application No. 60/090,773, filed Jun. 26, 1998.

BACKGROUND OF THE INVENTION

This invention relates generally to electric motors and, more particularly, to a line start magnetically salient rotor AC electric motor.

Line start permanent magnet motors include rotors having permanent magnets and induction squirrel-ages. The induction squirrel cages enable starting on a conventional AC power source, and the permanent magnets improve motor efficiency. Such rotors sometimes are referred to herein as divided magnet rotors.

In an exemplary form, a divided magnet rotor includes a rotor core, a rotor shaft, permanently magnetized locations, and secondary conductors. The rotor shaft extends through the rotor core and is coaxial with the rotor core axis of rotation. The secondary conductors also extend through the rotor core and are arranged axially with respect to the rotor shaft. Such secondary conductors are offset from the outer circumference or periphery of the rotor core and are connected at opposite ends of the core by end rings. Notches at the outer periphery of the rotor core typically are radially aligned with at least one secondary conductor. Permanent magnets are located in the notches and the permanent magnets are magnetized to form a selected number of poles.

To decouple stator slot order harmonics, the rotor bars in the squirrel cage typically are skewed. Skewing is accomplished by slightly turning the rotor laminations with respect to each other so that the passages formed by overlapping slots of the rotor laminations are generally helical in shape. In a divided magnet rotor, skewing the laminations is difficult. Particularly, some magnetic materials that may be used for the permanent magnets are brittle and prevent such skewing.

In addition, open slot rotors generally provide advantages over closed slot rotors. In a closed slot rotor, the flux flows through the bridge (i.e., the region of iron immediately towards the rotor outer diameter from the rotor bar) and saturates the bridge depending on the rotor current. The level of current at which the bridge saturates will be passed through four times per cycle, causing time harmonics in the stator current. These time harmonics create the basic forcing function for a class of noise. The leakage flux which causes the bridge to saturate reduces the torque produced by the machine at that current level and in turn raises the losses related to current flow at a give torque. An open slot rotor does not provide a high permeability path for this component of the leakage flux. Open slot rotors, however, typically are more difficult to fabricate than closed slot rotors.

It would be desirable to provide a divided magnet rotor that includes permanent magnets yet also decouples stator slot order harmonics. It also would be desirable to provide such a rotor which is not subject to rotor bridge saturation.

BRIEF SUMMARY OF THE INVENTION

In an exemplary embodiment of the invention, a divided magnet rotor includes a stepped skew rather than a helical skew. The stepped skew enables the use of straight magnet sections that can be inserted into the rotor core notches thereby eliminating the need to produce a helix from the rotor cage. The stepped skew is effective in decoupling stator slot order harmonics. In addition, the stepped skew rotor includes, in some embodiments, open slots so that the rotor is not subject to rotor bridge saturation.

The divided magnet rotor includes a rotor core, a rotor shaft, permanently magnetized locations, and secondary conductors. The rotor shaft extends through the rotor core and is coaxial with the rotor core axis of rotation.

The rotor core includes rotor laminations in a stack arranged in at least two sets. The slots in the first set of laminations have skew portions extending laterally in a first direction, and the slots in the second set of laminations have skew portions extending laterally in a second direction opposite the first direction. The radially inner portions of corresponding slots in the first and second sets of rotor laminations overlap each other. Such a configuration forms a stepped skew.

Notches, or channels, extend from an outer diameter (OD) of the rotor laminations to the skew portion of each respective slot. The notches extend axinay, and permanent magnets are located in the notches. Specifically, straight magnet sections of permanently magnetized material are inserted into the notches. The straight magnet sections are magnetized to form a selected number of poles. The secondary conductors extend through the rotor core slots and are arranged axially with respect to the rotor shaft. The secondary conductors are offset from the outer circumference or periphery of the rotor core and are connected at opposite ends of the core by end rings.

The above described divided magnet rotor has a stepped skew rather than a helical skew. The stepped skew enables the use of straight magnet sections that can be inserted into the rotor thereby eliminating the need to produce a helix from the rotor cage. The stepped skew is effective in decoupling stator slot order harmonics. In addition, the rotor has open slots so that the rotor is not subject to rotor bridge saturation.

DETAILED DESCRIPTION OF THE INVENTION

Set forth below in more detail is a description of various exemplary embodiments of divided magnet stepped skew rotors. The rotors may be used in many different motor configurations including many different stator configurations. Generally, a divided magnet stepped skew rotor includes a squirrel cage with permanent magnets secured at an outer periphery of the rotor laminations. The stepped skew enables the use of straight sections of permanent magnets rather than requiring that the permanent magnets be skewed. This rotor configuration facilitates the fabrication of divided magnet rotors since the stepped skew enables use of straight magnetic sections yet also is effective in decoupling stator slot order harmonics. In addition, and in some embodiments, the rotor has open slots so that the rotor is not subject to rotor bridge saturation.

Figure 1:
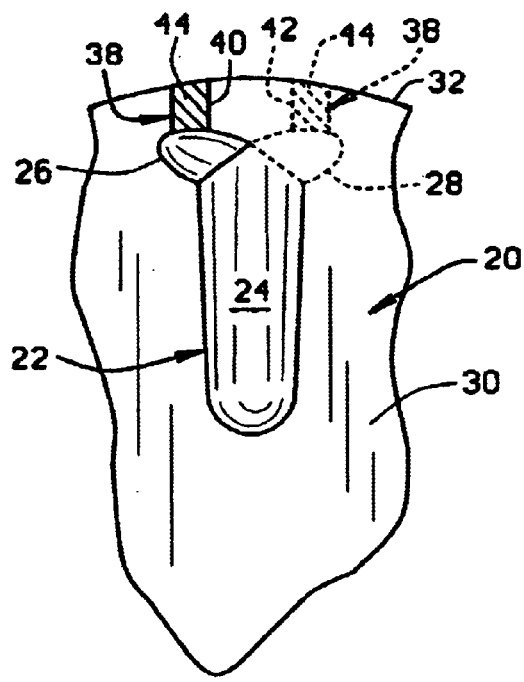
FIG. 1 is an enlarged fragmentary view of a first embodiment of a rotor core having slots which are skewed.
Figure 2:
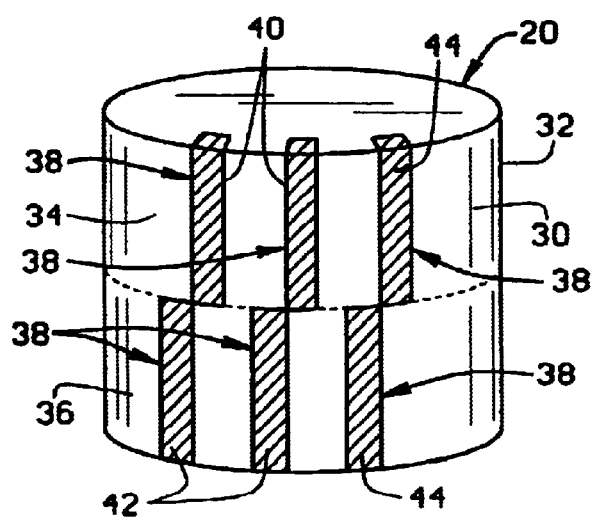
FIG. 2 is a perspective view of the rotor core shown in FIG. 1.

Referring now particularly to the drawings, FIG. 1 is an enlarged fragmentary view of a first embodiment of a rotor core 20, and FIG. 2 is a perspective schematic view of core 20. The schematic views set forth herein are intended only to illustrate various configurations of permanent magnets with respect to the rotor cores and do not illustrate each aspect of such cores. Core 20 has slots 22 which are skewed. Slots 22 include a radially inner portion 24 and first and second skew portions 26 and 28. Core 20 also includes a plurality of laminations 30 having an outer periphery 32. A first set 34 of rotor laminations 30 has a plurality of slots 22 having first skew portions 26 extending in a first direction, and a second set 36 of rotor laminations 30 has a plurality of slots 22 having second skew portions 28 extending in a second direction.

Core 20 further includes a plurality of notches 38 having an open end at outer periphery 32. In the embodiment shown in FIGS. 1 and 2, each notch 38 extends axially with respect to a center axis of rotor core 20, and each notch 38 is coextensive with a respective one of slots 22. No bridge of lamination material extends between notches 38 and slots 22, and notches 38 have a substantially rectangular cross sectional shape. As shown in FIG. 1, a first notch 40 is substantially aligned and coextensive with first skew portion 26, and a second notch 42 is substantially aligned and coextensive with second skew portion 28. Permanently magnetizable material 44 is located in notches 40 and 42.

Figure 3:
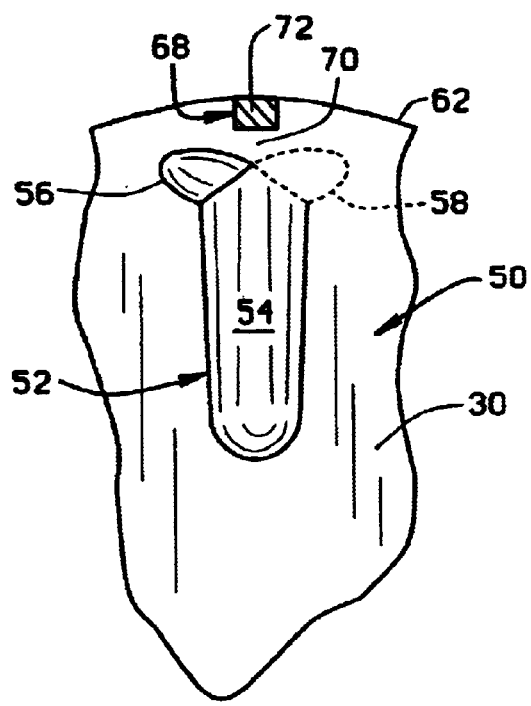
FIG. 3 is an enlarged fragmentary view of a second embodiment of a rotor core having slots which are skewed.
Figure 4:
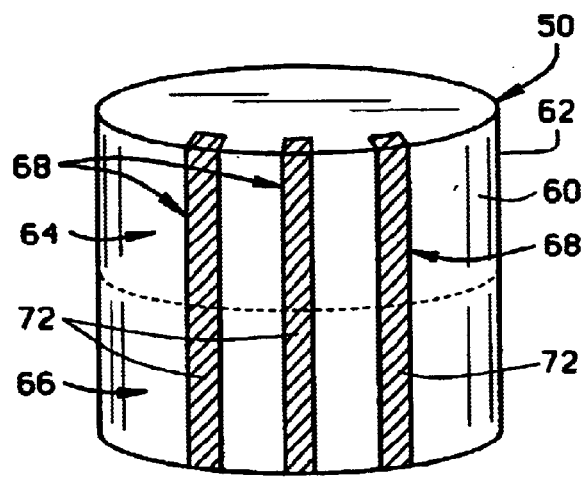
FIG. 4 is a perspective view of the rotor core shown in FIG. 3.

FIG. 3 is an enlarged fragmentary view of a second embodiment of a rotor core 50, and FIG. 4 is a perspective schematic view of core 50. Core 50 has slots 52 which are skewed. Slots 52 include a radially inner portion 54 and first and second skew portions 56 and 58. Core 50 also includes a plurality of laminations 60 having an outer periphery 62. A first set 64 of rotor laminations 60 has a plurality of slots 52 having first skew portions 56 extending in a first direction, and a second set 66 of rotor laminations 60 has a plurality of slots 52 having second skew portions 58 extending in a second direction.

Core 50 further includes a plurality of notches 68 having an open end at outer periphery 62. In the embodiment shown in FIGS. 3 and 4, each notch 68 extends axially with respect to a center axis of rotor core 50 and along an entire length of core 50. A bridge 70 of lamination material extends between each notch 68 and respective slots 52. Notch 68 has a substantially rectangular cross sectional shape, and each notch 68 is substantially aligned with a radial axis of one of slot radial inner portions 54. Permanently magnetizable material 72 is located in notches 68.

Figure 5:
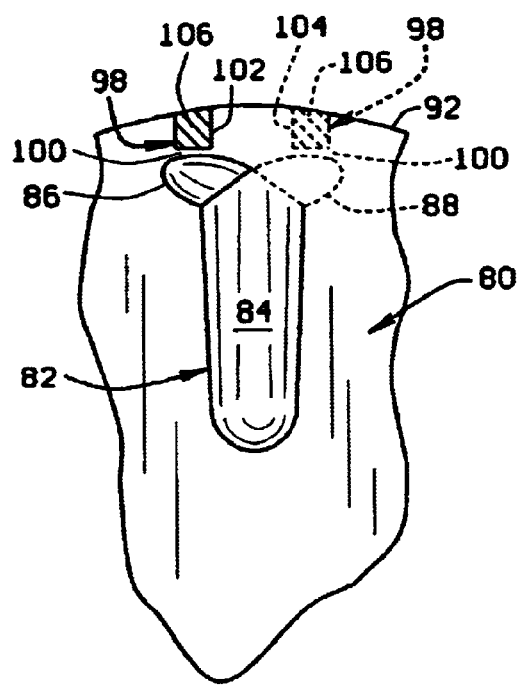
FIG. 5 is an enlarged fragmentary view of a third embodiment of a rotor core having slots which are skewed.
Figure 6:
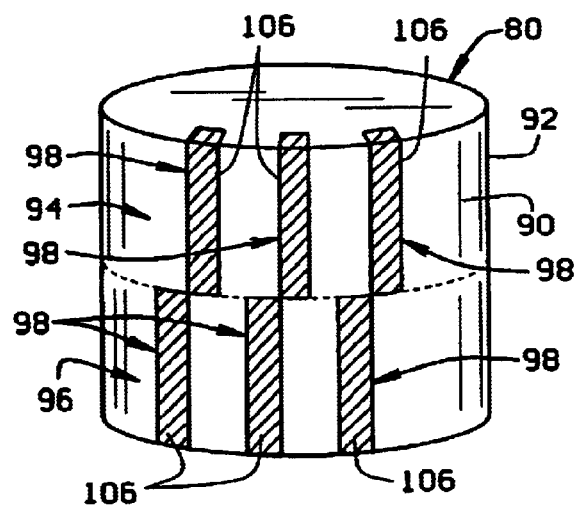
FIG. 6 is a perspective view of the rotor core shown in FIG. 5.

FIG. 5 is an enlarged fragmentary view of a third embodiment of a rotor core 80, and FIG. 6 is a perspective schematic view of core 80. Core 80 has slots 82 which are skewed. Slots 82 include a radially inner portion 84 and first and second skew portions 86 and 88. Core 80 also includes a plurality of laminations 90 having an outer periphery 92. A first set 94 of rotor laminations 90 has a plurality of slots 82 having first skew portions 86 extending in a first direction, and a second set 96 of rotor laminations 90 has a plurality of slots 82 having second skew portions 88 extending in a second direction.

Core 80 further includes a plurality of notches 98 having an open end at outer periphery 92. In the embodiment shown in FIGS. 5 and 6, each notch 98 extends axially with respect to a center axis of rotor core 80, and each notch 98 is coextensive with a respective one of slots 82. A bridge 100 of lamination material extends between notches 98 and slots 82, and notches 98 have a substantially rectangular cross sectional shape. As shown in FIG. 5, a first notch 102 is substantially aligned and coextensive with first skew portion 86, and a second notch 104 is substantially aligned and coextensive with second skew portion 88. Permanently magnetizable material 106 is located in notches 98.

Figure 7:
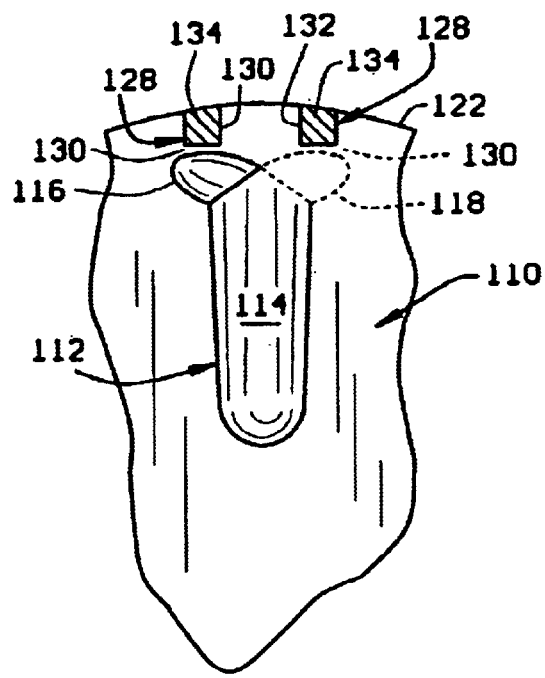
FIG. 7 is an enlarged fragmentary view of a fourth embodiment of a rotor core having slots which are skewed.
Figure 8:
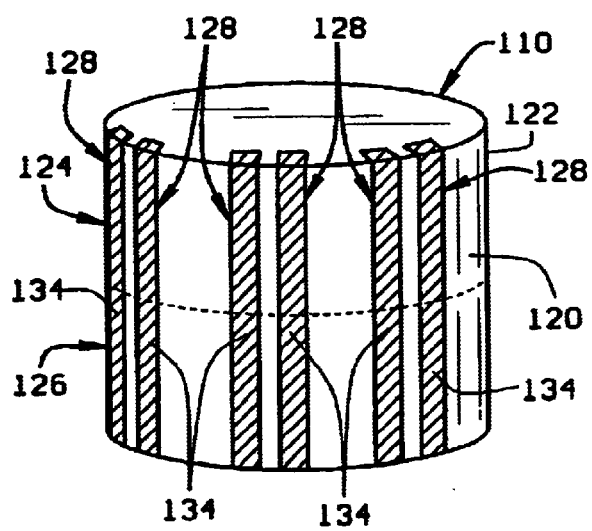
FIG. 8 is a perspective view of the rotor core shown in FIG. 7.

FIG. 7 is an enlarged fragmentary view of a fourth embodiment of a rotor core 110, and FIG. 8 is a perspective schematic view of some elements of core 110. Core 110 has slots 112 which are skewed. Slots 112 include a radially inner portion 114 and first and second skew portions 116 and 118. Core 110 also includes a plurality of laminations 120 having an outer periphery 122. A few set 124 of rotor laminations 120 has a plurality of slots 112 having first skew portions 116 extending in a first direction, and a second set 126 of rotor laminations 120 has a plurality of slots 112 having second skew portions 118 extending in a second direction.

Core 110 further includes a plurality of notches 128 having an open end at outer periphery 122. In the embodiment shown in FIGS. 7 and 8, each notch 128 extends axially with respect to a center axis of rotor core 110, and each notch 128 extends the entire length of core 110. A bridge 130 of lamination material extends between notches 128 and slots 112, and notches 128 have a substantially rectangular cross sectional shape. As shown in FIG. 7, a first notch 130 is substantially aligned and coextensive with first skew portion 116, and a second notch 132 is substantially aligned and coextensive with second skew portion 118. Permanently magnetizable material 134 is located in notches 128.

Figure 9:
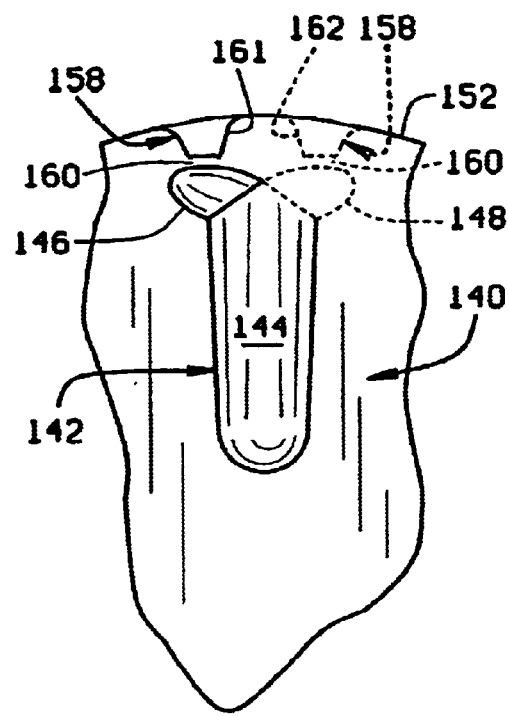
FIG. 9 is an enlarged fragmentary view of a fifth embodiment of a rotor core having open slots which are skewed.
Figure 10:
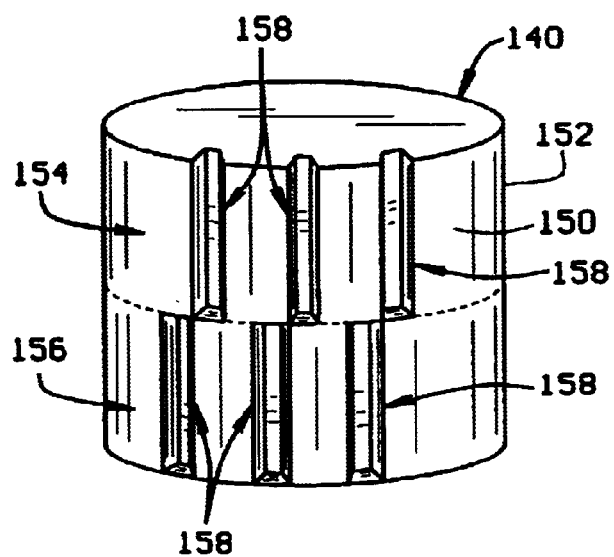
FIG. 10 is a perspective view of the rotor core shown in FIG. 9.

FIG. 9 is an enlarged fragmentary view of a fifth embodiment of a rotor core 140, and FIG. 10 is a perspective schematic view of core 140. Core 140 has slots 142 which are skewed. Slots 142 include a radially inner portion 144 and first and second skew portions 146 and 148. Core 140 also includes a plurality of laminations 150 having an outer periphery 152. A first set 154 of rotor laminations 150 has a plurality of slots 142 having first skew portions 146 extending in a first direction, and a second set 156 of rotor laminations 150 has a plurality of slots 142 having second skew portions 148 extending in a second direction.

Core 140 further includes a plurality of notches 158 having an open end at outer periphery 152. In the embodiment shown in FIGS. 9 and 10, each notch 158 extends axially with respect to a center axis of rotor core 140, and each notch 158 is coextensive with a respective one of slots 142. A bridge 160 of lamination material extends between notches 158 and slots 142, and notches 158 have an irregular cross sectional shape. As shown in FIG. 9, a first notch 161 is substantially aligned and coextensive with first skew portion 146, and a second notch 162 is substantially aligned and coextensive with second skew portion 148. Notches 158 are open and do not include permanent magnets. Rotor core 140 is thus an open slot rotor.

Figure 11:
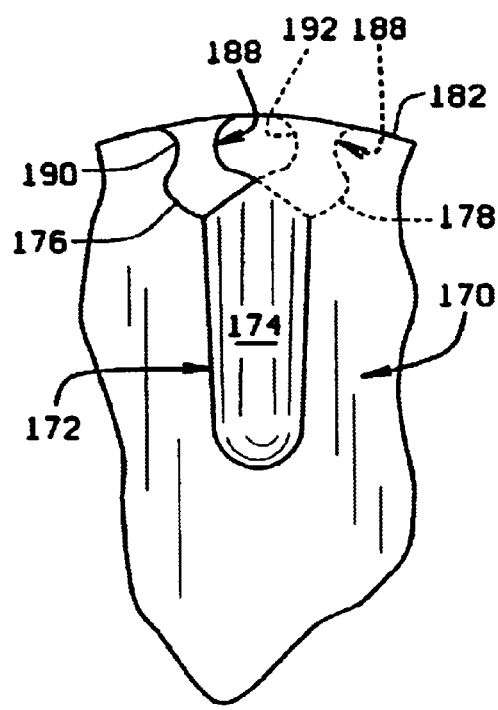
FIG. 11 is an enlarged fragmentary view of a sixth embodiment of a rotor core having open slots which are skewed.
Figure 12:
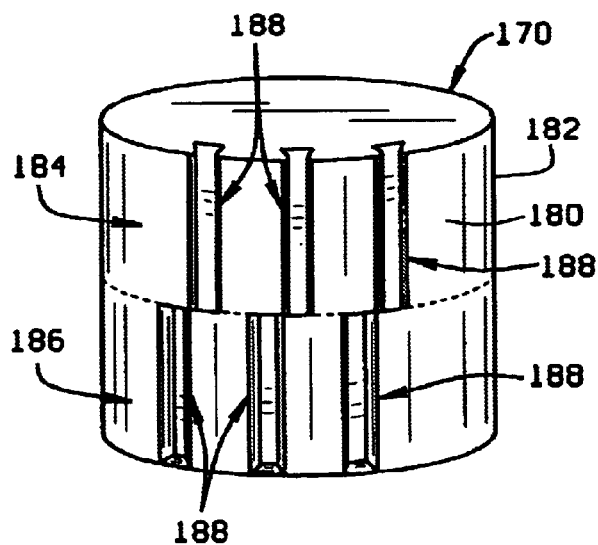
FIG. 12 is a perspective view of the rotor core shown in FIG. 11.

FIG. 11 is an enlarged fragmentary view of a sixth embodiment of a rotor core 170, and FIG. 12 is a perspective schematic view of core 170. Core 170 has slots 172 which are skewed. Slots 172 include a radially inner portion 174 and first and second skew portions 176 and 178. Core 170 also includes a plurality of laminations 180 having an outer periphery 182. A first set 184 of rotor laminations 180 has a plurality of slots 172 having first skew portions 176 extending in a first direction, and a second set 186 of rotor 180 laminations has a plurality of slots 172 having second skew portions 178 extending in a second direction.

Core 170 further includes a plurality of notches 188 having an open end at outer periphery 182. In the embodiment shown in FIGS. 11 and 12, each notch 188 extends axially with respect to a center axis of rotor core 170, and each notch 188 is coextensive with a respective one of slots 172. No bridge of lamination material extends between notches 188 and slots 172, and notches 188 have an irregular cross sectional shape. As shown in FIG. 11, a first notch 190 is substantially aligned and coextensive with first skew portion 176, and a second notch 192 is substantially aligned and coextensive with second skew portion 178 Notches 188 are open and do not include permanent magnets. Rotor core 170 is thus an open slot rotor. In one embodiment, the rotor assembly is fabricated by pouring a molten metal such as aluminum into slots 172 and notches 188 while rotor core 170 is maintained within a cast that prevents the molten aluminum from freely flowing out of notches 188. Rotor core 170 is then brushed to remove any excess aluminum from the outside of rotor laminations 180. In an alternative embodiment, the rotor assembly is fabricated by initially forming rotor core 170 with a thin wall of lamination material on the outside of notches 188. Molten aluminum is then poured into slots 172 and notches 188. The thin wall of lamination material on the outside of notches 188 is then removed so that slots 172 and notches 188 form open slots.

Figure 13:
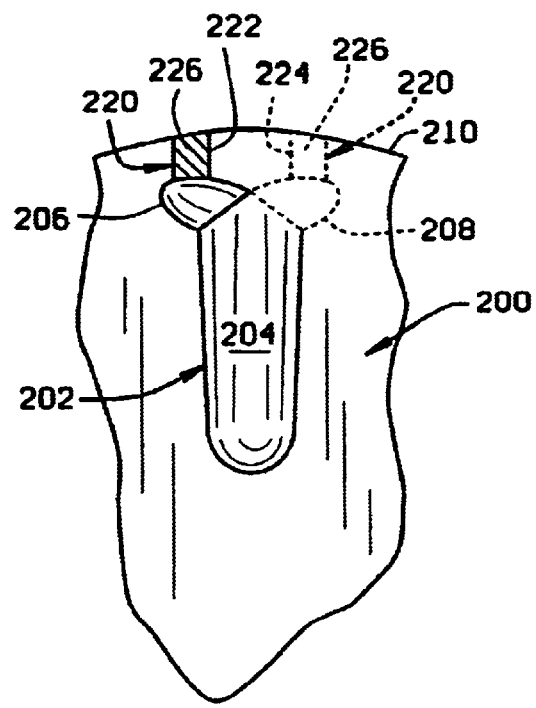
FIG. 13 is an enlarged fragmentary view of a seventh embodiment of a rotor core having slots which are skewed.
Figure 14:
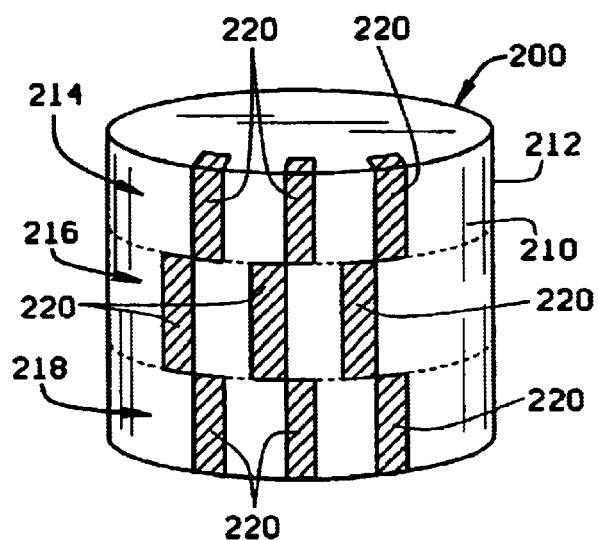
FIG. 14 is a perspective view of the rotor core shown in FIG. 13.

FIG. 13 is an enlarged fragmentary view of a seventh embodiment of a rotor core 200, and FIG. 14 is a perspective schematic view of core 200. Core 200 has slots 202 which are skewed. Slots 202 include a radially inner portion 204 and first and second skew portions 206 and 208. Core 200 also includes a plurality of laminations 210 having an outer periphery 212. A first set 214 of rotor laminations 210 has a plurality of slots 202 having first skew portions 206 extending in a first direction, a second set 216 of rotor laminations 210 has a plurality of slots 202 having second skew portions 208 extending in a second direction, and a third set 218 of rotor laminations 210 has a plurality of slots 202 having first skew portions 206 extending in a first direction.

Core 200 further includes a plurality of notches 220 having an open end at outer periphery 212. In the embodiment shown in FIGS. 13 and 14, each notch 220 extends axially with respect to a center axis of rotor core 200, and each notch 220 is coextensive with a respective one of slots 202. No bridge of lamination material extends between notches 220 and slots 202, and notches 220 have a substantially rectangular cross sectional shape. As shown in FIG. 13, a first notch 222 is substantially aligned and coextensive with first skew portion 206, and a second notch 224 is substantially aligned and coextensive with second skew portion 208. Permanently magnetizable material 226 is located in notches 222 and 224.

Many variations of the above described rotor cores are possible. For example, additional sets of rotor laminations can be added depending upon the desired operating characteristics. In addition, the particular dimensions of the slots can be selected to provide desired operating characteristics. Dimensions of such slots are discussed, for example, in U.S. Pat. No. 5,640,064, which is assigned to the present assignee and hereby incorporated herein, in its entirety, by reference. Additional details regarding divided magnet rotors are set forth, for example, in U.S. Pat. No. 5,548,172, which is assigned to the present assignee and hereby incorporated herein, in its entirety, by reference. The rotor cores described above could also be fabricated without the notches located on the outer periphery of the rotor laminations. The rotor bar slots would still have a stepped skew and the rotor bar slots could either be open slots or closed slots.

Figure 15:
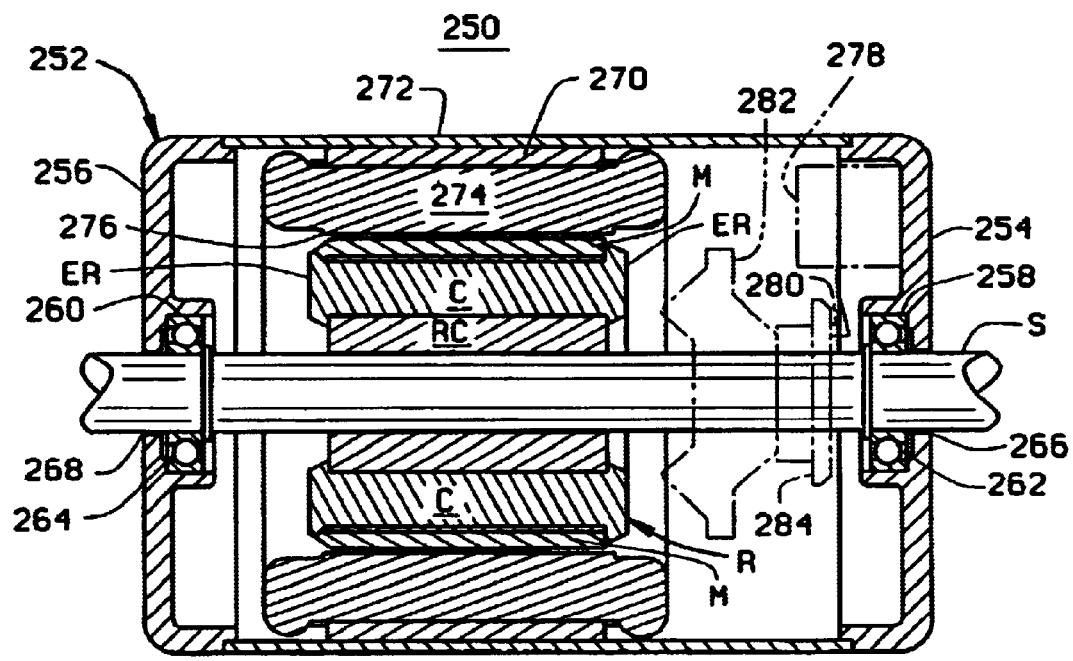
FIG. 15 is a partial cross sectional view of a motor.

FIG. 15 illustrates a motor 250 which may incorporate any of the rotors R described above. Motor 250 includes a housing 252 having motor endshields 254 and 256 secured thereto. Motor endshields 254 and 256 include supports 258 and 260 for bearing assemblies 262 and 264. Rotor shaft S is coaxially aligned with bearing assemblies 262 and 264 and extends through openings 266 and 268 formed in endshields 254 and 256.

Motor 250 also includes a stator 270 having a stator core 272 and stator windings 274 Stator windings 274 include a start winding and a first and a second main winding. The first winding is wound to form a first, lower, number of poles and the second main winding is wound to form a second, higher, number of poles. The start winding is wound to form a number of poles equal to the number of poles of the first main winding. Stator core 272 forms a rotor bore 276 Rotor shaft S is concentrically arranged axially of stator core 272, and rotor core RC is positioned concentrically with rotor shaft S.

A switching unit 278, shown in phantom, is mounted to endshield 254. Switching unit 278 includes, in one form, a movable mechanical arm 280 A centrifugal force responsive assembly 282, also shown in phantom, is mounted to rotor shaft S and includes a push collar 284 which engages mechanical arm 280. Push collar 284 is slidably mounted on rotor shaft S. Assembly 282 also includes a weighted arm and spring (not shown in detail) secured to rotor shaft S. The weighted arm is calibrated to move from a fit position to a second position when the rotor speed exceeds a predetermined speed. When the weighted arm moves to the second position, push collar 284 also moves from a first position to a second position. As a result, mechanical arm 280 of switching unit 278 moves from a first position to a second position, which causes switching unit 278 to switch from a first circuit-making position to a second circuit-making position. Switching unit 278 is utilized separately in some applications (without arm 280) and switching unit 278 and assembly 282 are utilized in combination in other applications. Switches used to control energization of start and main windings are well known. Synchronized switching apparatus and methods which may be utilized in motor 250 are described, for example, in U.S. patent application Ser. No. 09/042,374, filed Mar. 13, 1998, and hereby incorporated herein, in its entirety, by reference.

In one specific embodiment, the first main stator winding is wound to form four poles and the second main stator winding is wound to form six poles. Motor rotor permanent magnets M are magnetized to form six poles. Switching unit 278 is coupled to an external control, such as a furnace control. Centrifugal force responsive assembly 282 is not utilized in this particular application. Switching unit 278 causes the first main winding to be energized for the high fire mode and the second main stator winding to be energized for the low fire mode.

In operation, and at motor start-up, the stator start winding and the first main winding are energized. The magnetic fields generated by such windings induce currents in squirrel cage conductors C of motor rotor R, and the magnetic fields of such windings and conductors C couple and rotor R begins to rotate. Since the start winding and first main winding form four poles, the magnetic fields of the such windings do not effectively couple to the magnetic fields of rotor permanent magnets M configured to form six poles.

Once rotor R has sufficient speed, the start winding is de-energized. If the furnace is to operate in the high fire mode, switching unit 278 causes the first main winding to remain energized. As a result, motor 250 operates as an induction motor in a relatively higher speed, four pole mode of operation. If the furnace is to operate in the low fire mode, however, switching unit 278 energizes the second main winding and the first main winding is de-energized. As a result, the rotor speed decreases.

When the rotor speed equals the six pole synchronous speed, i.e., 1200 rpm, the magnetic fields of rotor permanent magnets M couple with, and "lock" into, the magnetic fields generated by the second main winding. Rotor R then rotates at substantially the synchronous speed for the six pole configuration, i.e., 1200 rpm. If the furnace is required to later operate in the high fire mode, switching unit 278 energizes the first main winding and de-energizes the second main winding. Motor 250 then operates as an induction motor and the rotor speed increases.

In another application, and as in the embodiment discussed above, the first main stator winding is wound to form four poles and the second main stator winding is wound to form six poles. Motor rotor permanent magnets M are magnetized to form six poles. In this particular application, motor 250 operates as a single speed motor. Centrifugal force responsive assembly 282 is utilized and is calibrated to transition from the first position to the second position when the rotor speed exceeds 1200 rpm, i.e., six pole synchronous speed. When switching unit 278 is in the first circuit-making position, the first main winding is energized, i.e., the lower pole mode. When unit 278 is in the second circuit-making position, the second main winding is energized, i.e., the higher pole mode. Centrifugal force responsive assemblies and switches are well known and are described, for example, in more detail in U.S. Pat. Nos. 4,726,112 and 4,856,182, both of which patents are assigned to the present assignee.

In operation, and at motor start-up, switching unit 278 is in the first circuit-making position and the first main winding and the start winding are energized. The magnetic fields generated by such windings induce currents in squirrel cage conductors C of motor rotor R. The magnetic fields of such windings and rotor secondary conductors C couple and rotor R begins to rotate. Since the first main winding and start winding are energized to form four poles, the magnetic fields of such windings do not effectively couple to the magnetic fields of permanent magnets M which are magnetized to form six poles.

Once the speed of rotor R exceeds 1200 rpm, the weighted arm of assembly 282 causes push collar 284 to move to the second position. Push collar 284 causes mechanical arm 280 to move to the second position, and switching unit 278 switches to the second circuit-making position. The second main winding is then energized. As a result, the speed of rotor R decreases. When the rotor speed equals the six pole synchronous speed, i.e., 1200 rpm, the magnetic fields of the rotor permanent magnets M couple with, and "lock" into, the magnetic fields generated by the second main winding. Rotor R then rotates at substantially the synchronous speed ti for the six pole configuration, i.e., 1200 rpm. As described above, rotor R is "dragged" or "coasts" into synchronous speed rather than "pushed" into synchronous speed. Enabling rotor R to coast into synchronous speed is much easier than attempting to "push" rotor R into synchronous speed with a lower pole induction winding, which is typical in known line start synchronous A.C. motors. Additional details relating to starting and running divided magnet motors are set forth, for example, in U.S. Pat. No. 5,758,709, which is assigned to the present assignee and hereby incorporated herein, in its entirety, by reference.

Many modifications and variations of motor 250 illustrated in FIG. 3 are possible and contemplated. For example, motor 250 could be configured to operate as a two pole/four pole motor, a six pole/eight pole motor, or some other two mode motor. The specific structure of motor 250, such as the type of bearing assemblies 262 and 264 and motor frame, of course, may also vary. Switches other than centrifugal force responsive switches can be used for the one speed unit. For example, a rotor speed sensor and switch mounted to stator 270 or optic based controls could be utilized.

With respect to the manufacture and assembly of rotor R, laminations are stamped from steel. As is well known, each lamination may be annealed or otherwise treated so that a coating of insulating material is formed thereon. Laminations are then stacked, for example in two sets, to a desired height to form the rotor core. Rotor laminations are stacked so that radially inner portions of the slots are aligned, and the skew portions in the first set are offset from the skew portions in the second set.

Once laminations are stacked to the selected height and aligned, as described above, permanent magnets M are formed or located in the notches at the rotor core outer periphery using, for example, an injection molding process. Particularly, magnets may be formed from neodymium iron using injection molding. Neodymium iron in a form suitable for injection molding is commercially available from the Magnaquench division of General Motors located in Anderson, Ind. Alternatively, magnets M could be manufactured using alternative techniques such as extrusion, casting and sintering processes, and then secured to the rotor core.

Squirrel cage conductors C and rotor end rings ER are then formed using an aluminum die cast process. Rotor shaft S is then inserted through aligned openings in each lamination and the end rings. Rotor shaft S is secured to the end rings by welding, for example. Magnets M may then be magnetized. Additional details regarding assembly of a rotor and a motor are set forth, for example, in U.S. Pat. Nos. 4,726,112 and 5,548,172, which are assigned to the present assignee.

The above described divided magnet rotors have a stepped skew rather than a helical skew, and the steed skew enables the use of straight magnet sections that can be inserted into the rotor thereby eliminating the need to produce a helix from the rotor cage. The stepped skew also is effective in decoupling stator slot order harmonics. In addition, the rotors may have open slots so that in at least the open slot configuration, the rotor is not subject to rotor bridge saturation.

While the invention has been described in terms of various specific embodiments, those skilled in the art will recognize that the invention can be practiced with modification within the spirit and scope of the claims.

What is claimed is:

1. A rotor comprising a plurality of rotor laminations, each set of said laminations having an outer periphery, a first set of rotor laminations comprising a plurality of slots having skew portions extending in a first direction, a second set of said rotor laminations comprising a plurality of slots having skew portions extending in a second direction, and a plurality of notches having an open end at said outer periphery and substantially aligned radially and coextensive radially with at least one of said skew portions, wherein at least one of said notches is occupied by a metal.

2. A rotor core in accordance with claim 1 wherein each of said notches extends axially with respect to a center axis of said rotor core.

3. A rotor core in accordance with claim 2 wherein each of said notches is coextensive with a respective one of said slots.

4. A rotor core in accordance with claim 1 wherein each of said notches extend axially with respect to a center axis of said rotor core and along an entire length of said core.

5. A rotor core in accordance with claim 1 wherein each of said notches extend axially with respect to a center axis of said rotor core and along a portion of said core.

6. A rotor core in accordance with claim 1 wherein a bridge of lamination material extends between at least one of said notches and a respective one of said slots.

7. A rotor core in accordance with claim 1 wherein no bridge of lamination material extends between at least one of said notches and a respective one of said slots.

8. A rotor core in accordance with claim 1 wherein at least one of said notches has a rectangular cross sectional shape.

9. A rotor core in accordance with claim 1 wherein at least one of said notches has an irregular cross sectional shape.

10. A rotor core in accordance with claim 1 wherein a first notch is substantially aligned and coextensive with one of said skew portions of one of said slots in said first set of rotor laminations, and a second notch is substantially aligned and coextensive with one of said skew portions of one of said slots in said second set of rotor laminations.

11. A rotor core in accordance with claim 1 wherein a first notch is substantially aligned, for at least a portion of length of said first notch, with one of said skew portions of one of said slots in said first set of rotor laminations, and a second notch is substantially aligned, for at least a portion of a length of said second notch, with one of said skew portions of one of said slots in said second set of rotor laminations.

12. A rotor core in accordance with claim 1 wherein each of said slots comprises radially inner portions, and each of said notches is substantially aligned with a radial axis of one of said slot radial inner portions.

13. A rotor core in accordance with claim 1 further comprising a third set of rotor laminations comprising a plurality of slots having skew portions extending in the first direction.

14. A rotor for an electric motor, said rotor comprising:
a rotor core comprising a plurality of rotor laminations, each of said laminations having an outer periphery, a first set of rotor laminations comprising a plurality of slots having skew portions extending in a first direction, a second set of said rotor laminations comprising a plurality of slots having skew portions extending in a second direction, a plurality of notches having an open end at said outer periphery and substantially aligned radially and coextensive radially with at least one said skew portions, and a central rotor shaft opening, wherein at least one of said notches is occupied by a metal and remaining of said notches are occupied by at least one permanent magnet;
a rotor shaft having an axis which is coaxial with a rotor core axis of rotation and extending through said central rotor shaft opening; and
a plurality of secondary conductors extending through said slots.

15. A rotor in accordance with claim 14 wherein each of said notches extend axially with respect to a center axis of said rotor core and along an entire length of said core.

16. A rotor in accordance with claim 14 wherein each of said notches extend axially with respect to a center axis of said rotor core and along a portion of said core.

17. A rotor in accordance with claim 14 wherein a bridge of lamination material extends between at least one of said notches and a respective one of said slots.

18. A rotor in accordance with claim 14 wherein no bridge of lamination material extends between at least one of said notches and a respective one of said slots.

19. A rotor in accordance with claim 14 wherein a first notch is substantially aligned and coextensive with one of said skew portions of one of said slots in said first set of rotor laminations, and a second notch is substantially aligned and coextensive with one of said skew portions of one of said slots in said second set of rotor laminations.

20. A rotor in accordance with claim 14 wherein a first notch is substantially aligned, for at least a portion of length of said first notch, with one of said skew portions of one of said slots in said first set of rotor laminations, and a second notch is substantially aligned, for at least a portion of a length of said second notch, with one of said skew portions of one of said slots in said second set of rotor laminations.

21. An electric motor, comprising:
a stator comprising a stator core, first and second main windings, said first main winding configured to form a lower number of poles than said second main winding, said stator core forming a stator bore; and
a rotor core comprising a plurality of rotor laminations, each of said laminations having an outer periphery, a first set of rotor laminations comprising a plurality of slots having skew portions extending in a first direction, a second set of rotor laminations comprising a plurality of slots having skew portions extending in a second direction, a plurality of notches having an open end at said outer periphery and substantially aligned radially and coextensive radially with at least one of said skew portions, a plurality of secondary conductors extending through said slots, wherein at least one of said notches are occupied by a metal and remaining of said notches are occupied by at least one permanent magnet, wherein the at least one permanent magnet is magnetized to form a number of poles equal to the number of poles formed by said second main winding.

22. An electric motor in accordance with claim 21 wherein a first notch is substantially aligned and coextensive with one of said skew portions of one of said slots in said first set of rotor laminations, and a second notch is substantially aligned and coextensive with one of said skew portions of one of said slots in said second set of rotor laminations.

23. An electric motor in accordance with claim 21 wherein a first notch is substantially aligned, for at least a portion of length of said first notch, with one of said skew portions of one of said slots in said first set of rotor laminations, and a second notch is substantially aligned for at least a portion of a length of said second notch, with one of said skew portions of one of said slots in said second set of rotor laminations.

24. A rotor core in accordance with claim 1 comprising a lamination configured to be placed o over the at least one of said notches before filling the at least one of said notches with the metal and is configured to be removed after filling the at least out of said d notches with the metal.

25. A rotor in accordance with claim 14 further comprising a lamination configured to be placed over the at as one of said notches before filling the at least one of said notches with the metal and is configured to be removed after filling the at least one of said notches with the metal.

26. An electric motor in accordance with claim 21 further comprising a lamination configured to be over the at least one of said notches before filling the at least one of said notches with the metal and is configured to be removed after filling the at least one of said notches with the metal.

* * * * *